United States Patent [19]

Chautemps et al.

[11] Patent Number: 4,652,731
[45] Date of Patent: Mar. 24, 1987

[54] PROCESS AND DEVICE FOR DETECTING BAR CODES

[75] Inventors: Jacques Chautemps; Jean L. Coutures, both of St. Egreve, France

[73] Assignee: Thomson-CSF, Paris, France

[21] Appl. No.: 763,058

[22] Filed: Aug. 6, 1985

[30] Foreign Application Priority Data

Aug. 10, 1984 [FR] France ................. 84 12680

[51] Int. Cl.⁴ ............................... G06K 7/10
[52] U.S. Cl. .................... 235/462; 235/463; 235/464
[58] Field of Search .................. 235/462, 463, 464

[56] References Cited

U.S. PATENT DOCUMENTS

| | | |
|---|---|---|
| 29,449 | 10/1977 | Gorgens . |
| 3,351,906 | 11/1967 | Van Duuren . |
| 3,900,832 | 8/1975 | Hanchett . |
| 4,092,525 | 5/1978 | Daloub et al. . |
| 4,114,030 | 9/1978 | Nojiri ................. 235/464 |
| 4,351,004 | 9/1982 | Choate et al. . |

FOREIGN PATENT DOCUMENTS 0081316 6/1983 European Pat. Off. .

Primary Examiner—Harold I. Pitts
Attorney, Agent, or Firm—Roland Plottel

[57] ABSTRACT

A process of detecting bar codes constituted by bars having a height H and a width D and presenting flaws of a height A, which comprises the steps of summing the signals issuing from detectors of identical rank which belong to at least two rows of N detectors having a spacing pitch smaller than or equal to D/2, said rows being perpendicular to said codes so that at least one of the distances between said rows is greater than A, and comparing the sum signal thus obtained to a decision threshold to obtain a "code present" or "code absent" signal while eliminating any flaws possibly present in said codes.

13 Claims, 10 Drawing Figures

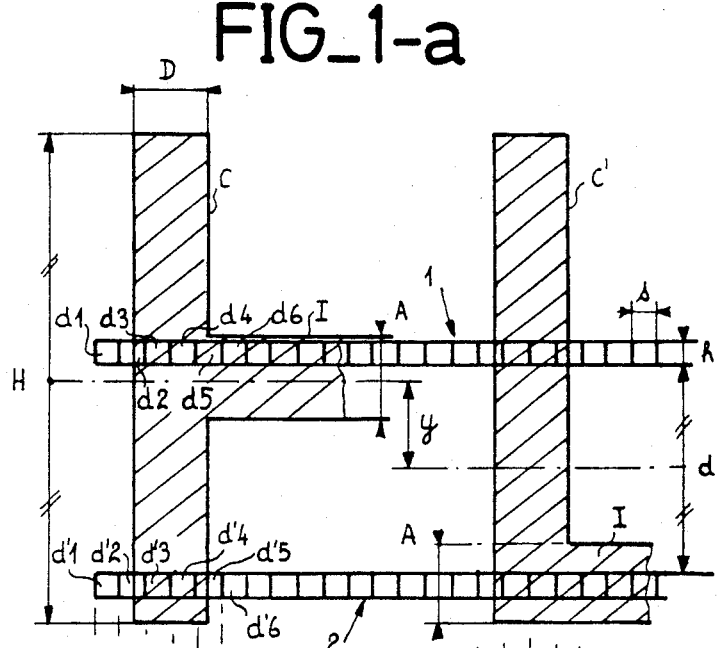

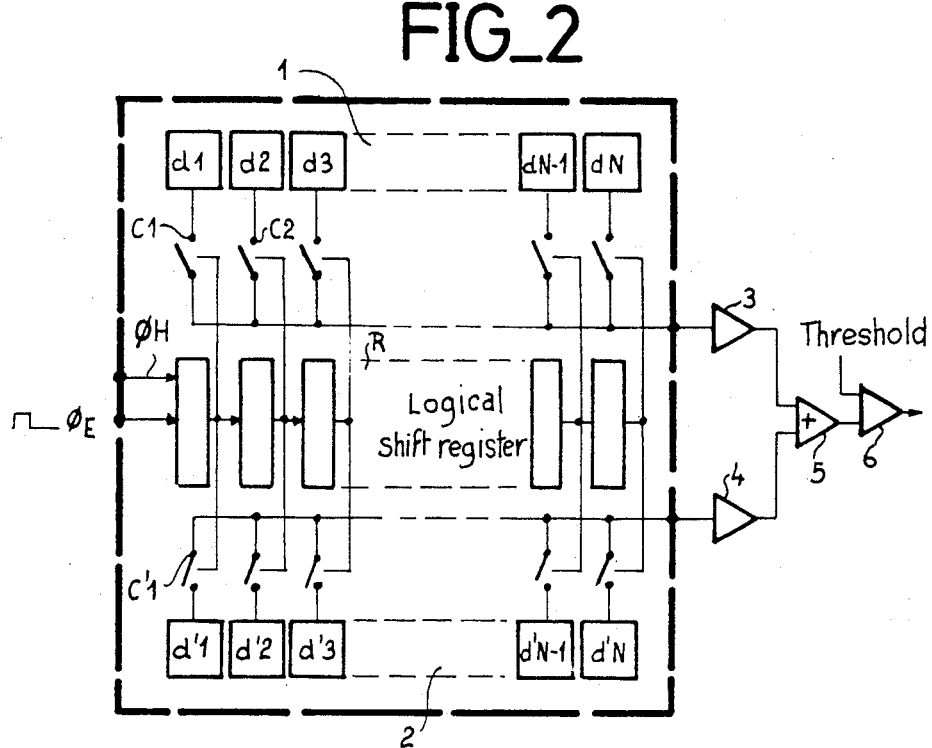
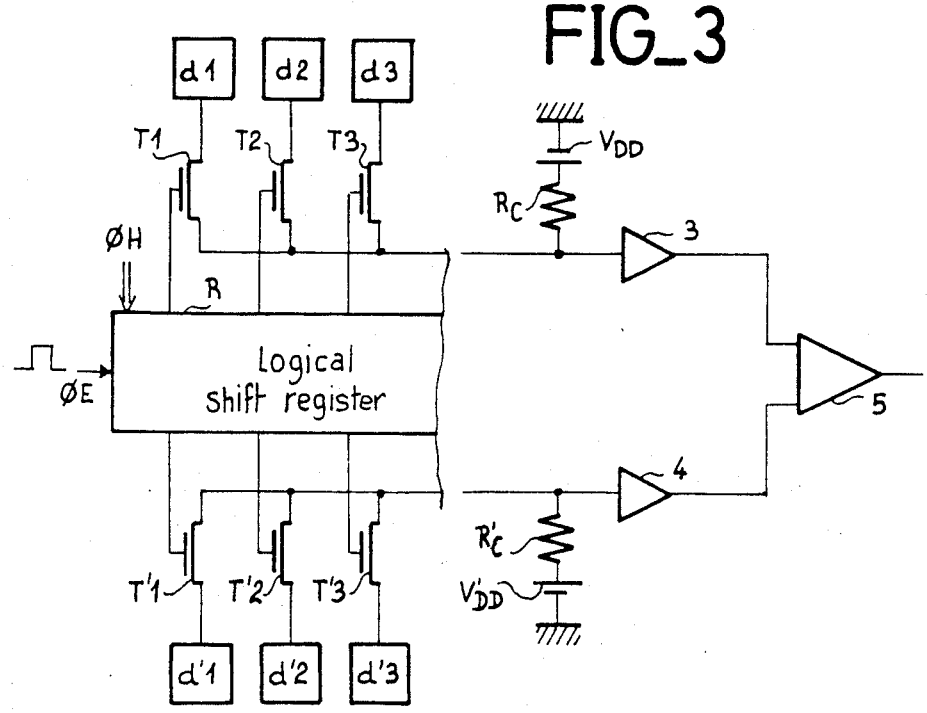

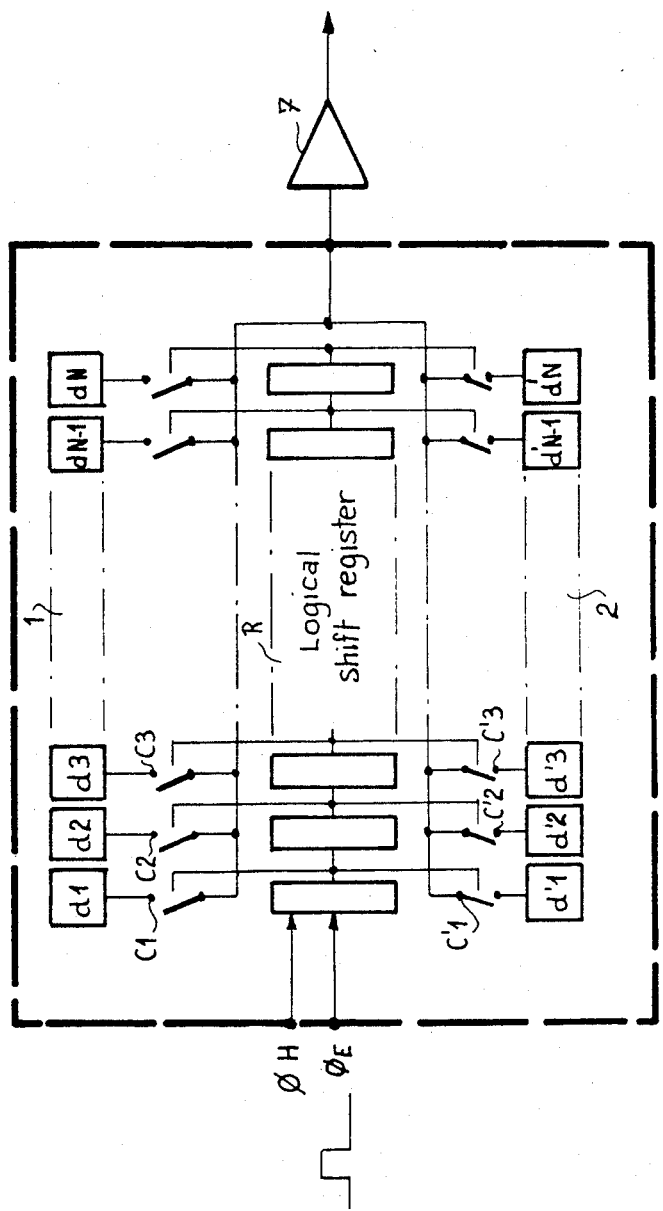
FIG_4

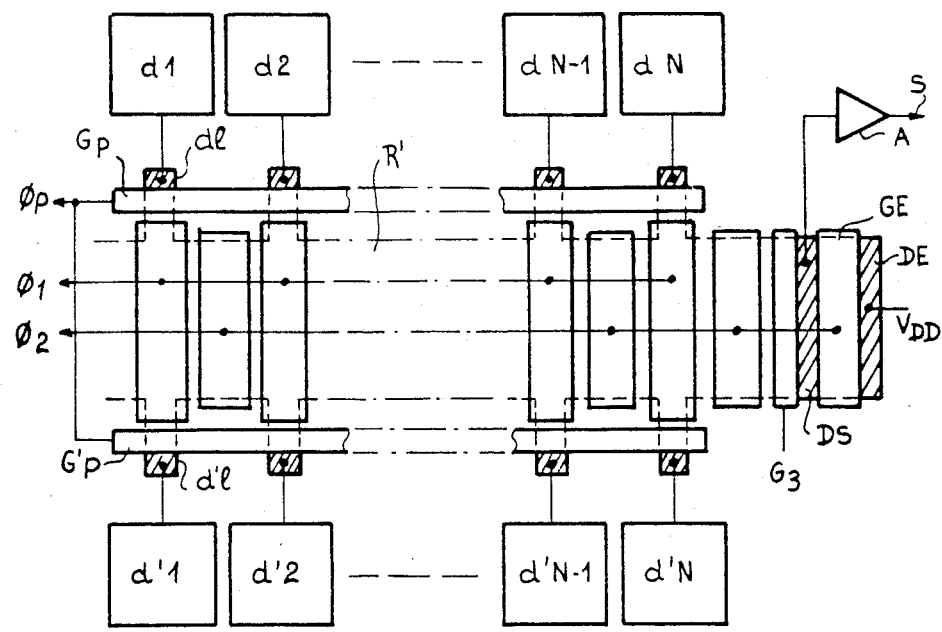
FIG_5
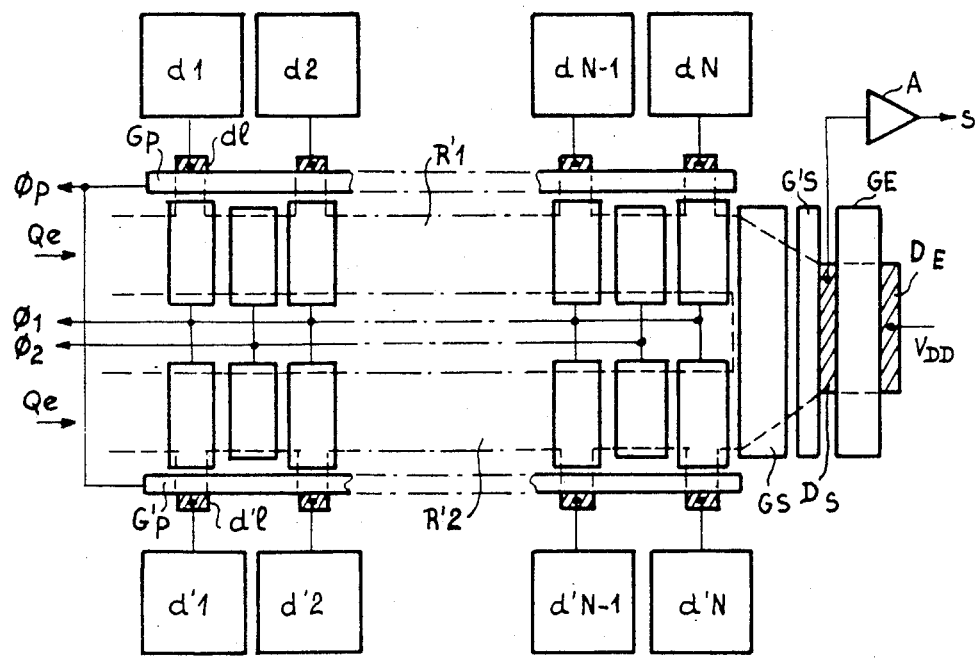
FIG_6

PROCESS AND DEVICE FOR DETECTING BAR CODES

FIELD OF THE INVENTION

The present invention is related to a process for detecting bar codes. It is also related to a device for carrying out this process.

BACKGROUND OF THE INVENTION

Bar codes are constituted by a coded succession of specifically grouped bars having a determined height H and a determined width D, or spaces void of bars. Codes of this type are used for marking items such as postal objects, checks, banker's drafts or the like, which are subsequently to be handled, e.g. sorted, checked, stored, etc.

The marking of objects with bar codes is generally performed by means of bar code marking machines of a particular type. Now, it is advantageous -especially from an economic point of view- to generate bar codes by using certain capital letters of conventional standard typewriters. In this case only the vertical lines forming the letter are used while the remaining lines, i.e. the horizontal or curved lines are considered as flaws and are consequently eliminated.

However, the code bar detection devices and reading heads currently used up till now are not adapted to the use of capital letters for producing bar codes.

The present invention aims at overcoming this drawback by providing a novel code bar detection process.

SUMMARY OF THE INVENTION

It is thus an object of the invention to provide a process for detecting codes constituted by bars having a height H and a width D and presenting flaws having a height A, which comprises the steps of establishing the sum of the signals issuing from detectors of identical rank which belong to at least two rows of N detectors arranged with a spacing pitch smaller than or equal to D/2, said rows being perpendicular to the codes so that at least one of the distances between the rows is greater than A; and comparing the sum signal to a decision threshold, so as to obtain a code-presence signal or a code-absence signal while eliminating the flaws.

This process is used particularly for detecting the bar codes produced from capital letters. However, said process can also be used for detecting bar codes printed or otherwise marked by conventional code bar marking machines. In this case the process according to the invention allows any flaws of the codes to be eliminated, such as horizontal bars, or blots having vertical dimensions smaller than a predetermined dimension.

With a view to providing correct detection of the presence of a bar code the decision threshold is not higher than 50% of the sum signal obtained when all the detectors of identical rank detect a white (or blank) level corresponding to the absence of any code or flaw, the black level being considered as the zero level.

Preferably said decision threshold is comprised between 35 and 45% of the sum signal so as to take into account the white level constituted by the ground on which the bar code is inscribed, as well as the sensitivity difference of the detectors.

It is another object of the present invention to provide a device for carrying out the above-defined process. Said device comprises at least two rows of N detectors arranged with a spacing pitch smaller than or equal to D/2, said rows being perpendicular to the codes so that at least one of the distances between said rows is greater than A; means for summing the signals issuing from the detectors of identical rank; and means for comparing the sum signals to a decision threshold and for generating a code presence or a code absence output signal while eliminating the flaws.

These and other objects, features and advantages of the present invention will become more clearly apparent from the following detailed description of various embodiments of the invention, which refers to the appended drawing and is given by way of illustration, but not of limitation.

BRIEF DESCRIPTION OF THE DRAWING

In the drawing:

FIGS. 1a to 1e are diagrams explaining the detection process according to the present invention and representing the different signals obtained.

FIG. 2 is a diagrammatic view of a first embodiment of the detection device according to the invention.

FIG. 3 shows a practical embodiment of the device of FIG. 2.

FIG. 4 schematically shows a second embodiment of the detection device according to the invention.

FIG. 5 is a schematic view of a third embodiment of the detection device according to the invention, and FIG. 6 schematically represents a fourth embodiment of the detection device according to the invention.

In the Figures identical reference symbols designate identical or similar elements. However, for clarity's sake the dimensions and proportions of the various elements have not been observed in the Figures.

DETAILED DESCRIPTION OF THE PREFERRED EMBODIMENTS

The process of detecting bar codes in accordance with the invention will be described herein-below in detail with particular reference to Fig. 1a which shows a first code C produced from an H and a second code C' produced from an L. In this case the vertical lines which have a determined height H and a determined width D constitute the bar codes properly speaking, whereas the horizontal lines I which have a height A are considered as flaws and are to be eliminated during detection.

With a view to detecting only the vertical lines having a height H and a width D at least two rows 1, 2 of N detectors $d_1, d_2, \ldots d_N, d'_1, d'_2, \ldots d'_N$ are used, said detector rows being positioned perpendicularly with respect to the bar codes. The distance d between the two rows 1, 2 of detectors is greater than the height A of the flaws, and consequently the latter are detected only by one of the detector rows. Furthermore, said distance d should satisfy the following relation:

$$d + 2h + 2y < H$$

wherein:

h represents the height of a detector, and y represents the maximum positioning error between the horizontal axes of the codes and the two detector rows.

The spacing pitch p of the detectors is so selected that $p = D/2$, whereby at least one detector $d_3, d'_3$ of one row detects a black level when a code is present. In the embodiment shown in FIG. 1a the value of p has been selected so as to be equal to D/3.

According to the present novel process a step of summing the signals supplied by detector rows 1 and 2 is performed.

Thus a more specific study of the signals detected by each detector row in the case of FIG. 1a shows that in the first row 1 detector $d_1$ detects a white or blank level, detector $d_2$ detects an intermediary gray level and detectors $d_3$, $d_4$, $d_5$, $d_6$ . . . detect a black level since they detect the presence of code C and flaw I. As regards the second detector row 2, detector $d'_1$ detects a gray level, detector $d'_3$ detects a black level, detector $d'_4$ detects a gray level, while detectors $d'_5$ and $d'_6$ detect a white level. Thus the signals shown in the left part of FIGS. 1b and 1c, respectively, are obtained. Similarly, as regards the detection of code C', the signals shown in the right hand part of FIGS. 1b and 1c are obtained.

Summing the above-mentioned signals results in obtaining the signal represented in FIG. 1d. This sum signal is compared to a decision threshold so that a detection signal is obtained which represents a zero level when no code is present (i.e. a white level or presence of flaws only), and a level "1" when a code is present. The detection signal is shown in FIG. 1e.

As shown in FIG. 1d the decision threshold is selected so as to be not higher than 50% of the sum signal corresponding to the sum of two white levels. Preferably the decision threshold represents from 35 to 45% of said sum signal, depending on the sensitivity and the quality of the detectors.

Referring to FIGS. 2 to 6 various embodiments of a bar code detecting device for carrying out the process according to the invention will now be described. These devices may be divided into two categories, to wit: devices effecting sequential "current reading" of the signals issuing from the detectors, and devices effecting simultaneous "load reading" of such signals. FIGS. 2 to 4 are related to devices of the first category while FIGS. 5 and 6 are related to devices of the second category.

In the embodiment of FIGS. 2 and 3, detectors $d_1$ to $d_N$ of the first row 1 are connected each through a switch $C_1$ to $C_N$ to an output line which is connected to a first current/voltage amplifier 3, and detectors $d'_1$ to $d'_N$ of the second row 2 are connected each through a switch $C'_1$ to $C'_N$ to an output line which is connected to a second current/voltage amplifier 4. The output terminals of the two amplifiers 3, 4 are connected to the input terminals of an adder 5 the output signal of which is supplied to one of the input terminals of a comparing device constituted, for example, by a differential amplifier the other input terminal of which receives the signal corresponding to the decision threshold.

Furthermore, switches $C_1$ to $C_N$ and $C'_1$ to $C'_N$ are connected respectively to the N output terminals of a logic shift register R with a series input terminal and parallel output terminals, the connections being arranged in such a manner that the switches of identical rank are connected to one and the same output terminal. Thus when a pulse $\Phi_E$ is shifted in register R under the action of clock $\Phi_H$ such pulse sequentially closes the switches of identical rank, thus allowing successive reading of the signals issuing from the detectors of identical rank at the output terminals of amplifiers 3 and 4. These signals are then summed in adder 5 and compared to the threshold in differential amplifier 6. Thus the output signal provided by the differential amplifier is the detection signal corresponding to the presence or the absence of codes, as shown in FIG. 1e.

As shown in FIG. 3, switches $C_1$ to $C_N$ and $C'_1$ to $C'_N$ are preferably constituted by MOS transistors $T_1$ to $T_N$ and $T'_1$ to $T'_N$ one of the electrodes of which is connected to a direct current voltage source $V_{DD}$, $V'_{DD}$ through the intermediary of a load resistor $R_C$, $R'_C$. The other electrode of each MOS transistor is connected to a detector, and the grid of each MOS transistor is connected to an output terminal of register R as mentioned herein-above. Thus when a pulse is transmitted to the grid of the transistors of identical rank the transistors become conductive, whereby the reading of the corresponding detectors is initiated; otherwise the MOS transistors are blocked.

The embodiment shown in FIG. 4 is somewhat similar to that of FIG. 2, the difference between said two embodiments residing in the fact that all the switches $C_1$ to $C_N$ and $C'_1$ to $C'_N$ are connected to one and the same output line carrying out the summing and the "current reading" of the signals issuing from the detectors of identical rank, whereby the adder can be omitted, while only one current/voltage amplifier 7 is required. In this embodiment the switches may also be constituted by MOS transistors.

In the embodiments shown in FIGS. 5 and 6 the signals issuing from the detectors are read and summed in the form of load packs, using shift registers of the CCD type (Charge Coupled Device).

Thus in the embodiment shown in FIG. 5 a single-charge transfer shift register R' with N parallel input terminals and a series output terminal is used for summing the charges or loads detected by the rows 1 and 2 of N detectors.

More specifically, each detector $d_1$ to $d_N$ of the first row is connected, through a reading diode $d_1$—which may be optional—and a pass gate on electrode $G_p$ connected to a potential $\Phi_p$, to the input terminal of the stage of identical rank of the shift register. Similarly each detector $d'_1$ to $d'_N$ of the second row is connected, through a reading diode $d'_1$—which may be optional—and a pass gate $G'_p$ connected to the same potential $\Phi_p$, to the stage of identical rank of the shift register.

Charge transfer shift register R' is a two-phase register. Consequently each stage comprises a couple of electrodes connected to control signal $\Phi_1$, and a couple of electrodes connected to a control signal $\Phi_2$. Each couple of electrodes is constituted by a storage electrode and a transfer electrode. The dissymmetry of the surface potentials which is required for ensuring unilateral transfer is obtained, for example, by providing an additional thickness of oxide, or by implanting impurities of the same type as the substrate. It will be obvious to those skilled in the art that other types of charge-transfer shift registers can also be used.

The output terminal of register R' is connected to a conventional charge-voltage reading stage. In the embodiment shown in FIG. 5 the latter is a reading stage performing destructive reading on a floating diode. Said reading stage is constituted essentially by a pass gate $G_S$ and a reading diode $D_S$ which is connected to an amplifier A. Said diode $D_S$ is preloaded by a gate $G_E$ connected to the control signal $\Phi_2$ and a diode $D_E$ connected to the direct current voltage $V_{DD}$.

Thus in the above-described device, when $\Phi_p$ is at the high level the charges detected by detectors $d_1$ to $d_N$ and $4'd_1$ to $d'_N$ are transferred simultaneously in the corresponding stages of register R' where the charges detected by detectors of identical rank are summed, the charges detected by $d_1$ and $d'_1$ being summed in the first stage of $R'$, while the charges detected by $d_2$ and $d'_2$ are summed in the second stage, and so forth. The charges are then transferred sequentially under the control of $\Phi_1$ and $\Phi_2$ to the reading stage so as to produce output sum-signals S which are compared to the detection threshold in a comparing stage (not shown). In another embodiment, shown in FIG. 6, each row 1, 2 of detectors $d_1$ to $d_N$ and $d'_1$ to $d'_N$ is associated to a charge transfer shift register $R'_1$, $R'_2$ with parallel inputs and a series output, comprising N stages. More specifically each detector of a row is connected through a reading diode $d_l$ or $d'_l$, which may be optional, and a pass gate $G_p$, $G'_p$ to a stage of a register $R'_l$ or $R'_2$. The two pass gates are connected to the same potential $\Phi_p$. The charge-transfer shift registers $R'_1$ or $R'_2$ are of a structure similar to that of charge-transfer shift register $R'$. They are controlled by the same control signals $\Phi_1$ and $\Phi_2$.

The output terminals of the two registers $R'_1$ or $R'_2$ are connected to a common reading stage which sums the charges issuing from stages of identical rank of the two registers, and effects the charge-current transformation. This reading stage performs destructive reading on a floating diode. It comprises a first storing gate $G_S$ which sums the charges, a pass gate $G'_S$ and a reading diode $D_S$ connected to an amplifier A the output terminal of which supplies the sum signals S. Reading diode $D_S$ is pre-loaded (or biased) by a gate $G_E$ and a diode $D_E$ connected to direct voltage $V_{DD}$.

With a view to improving the signal resolution the embodiment shown in FIG. 6 may use a driving charge $Q_e$ which is added to each signal charge during the detector transfer to the CCD register stage. This driving charge $Q_e$ is injected into each stage of shift registers $R'_1$ and $R'_2$ by an injection stage (not shown). This stage is constituted in a conventional manner by a diode and two pass gates.

When a driving charge $Q_e$ is used it is first injected into each stage of the shift registers during the integration period of the charges corresponding to the code reading. When such integration has been achieved the potential $\Phi_p$ of gates $G_p$ and $G'_p$ is brought to a high level, while the control potential $\Phi_1$ of registers $R'_1$ and $R'_2$ is at a low level. Thus the driving charge $Q_e$ is transferred to diodes $d_l$ and $d'_l$ and under the gates $G_p$ and $G'_p$ where it is added respectively to the signal charge issuing from detectors $d_l$ to $d_N$ or $d'_1$ to $d'_N$. The total charges $Q_e + Q_s$ are then transferred to the corresponding stage of registers $R'_1$ and $R'_2$ when $\Phi_1$ reaches a high level. The total charges $Q_e + Q_s$ are then transferred to the reading stage where they are converted into voltage so as to provide the sum signals that are compared to the detection threshold.

Using a driving charge allows the transfer of the signal to the charge-transfer register to be improved. It is thus possible to control the level and resolution of the output signal.

The different devices described herein-above are advantageous in that they can easily be integrated on one and the same semi-conductor substrate. Such substrate may be made of p-type or n-type silicon, gallium arseniure or of any other similar semi-conductive material. The detectors are preferably constituted by photodiodes. However it is also possible to use photo-MOS transistors or other light-sensitive detectors.

The above-described embodiments provide sum signals which, upon comparison with a decision threshold, supply a "code present" or "code absent" signal while eliminating the flaws.

In fact the selection of the embodiment to be used in practice depends on various criteria, such as the repetition pitch of the detectors, the type of integration, the number of detectors per detector row, etc.

For example, in the case of a large repetition pitch, e.g. 100 $\mu$m, devices including logic addressing registers will preferably be used. On the other hand, when the repetition pitch is small, e.g. below 30 $\mu$m, devices including CCD registers are indicated.

Furthermore, when the transfer or addressing frequency is high, e.g. higher than 2 MHz, devices including CCD registers should be preferred.

The invention is not limited to the embodiments shown and described herein; many variants and modifications may be envisaged by those skilled in the art without departing from the spirit and scope of the invention as defined in the appended claims.

What is claimed is:

1. A process of detecting bar codes constituted by bars having a height H and a width D and presenting flaws of a height A, which comprises the steps of summing the signals issuing from detectors of identical rank which belong to at least two rows of N detectors having a spacing pitch smaller than or equal to D/2, said rows being perpendicular to said codes so that at least one of the distances between said rows is greater than A, and comparing the sum signal thus obtained to a decision threshold to obtain a "code present" or "code absent" signal while eliminating any flaws possibly present in said codes.

2. A detection process according to claim 1, wherein said decision threshold is at most equal to 50% of the sum signal obtained, when all the detectors of identical rank detect a white level corresponding to absence of codes and flaws.

3. The detection process of claim 2, wherein said decision threshold is comprised between 35 and 45% of said sum signal.

4. A device for carrying out the process according to claim 1, which comprises at least two rows of N detectors having a spacing pitch smaller than or equal to D/2, said rows being perpendicular to said codes in such a manner that at least one of the distances between said rows is greater than A, means for summing and reading the signals issuing from detectors of identical rank, and means for comparing the thus-obtained sum signals to a decision threshold and for supplying a signal indicating the presence or the absence of codes, while eliminating the flaws possibly present in said codes.

5. A device according to claim 4, wherein said detectors are photodiodes or photo-MOS transistors.

6. A device according to claim 4, wherein said means for summing and reading said signals issuing from detectors of identical rank are constituted by arrays of switches associated to said detector rows, each switch of any one of said arrays being connected respectively to one detector and to an output line connected through a current voltage amplifier to one of the input terminals of a summer, and by a logic shift register addressing sequentially the switches of identical rank in the different arrays.

7. A device according to claim 4, wherein said means for summing and reading the signals issuing from detectors of identical rank are constituted by arrays of switches associated to said detector rows, each switch of any one of said arrays being connected respectively to a current/voltage amplifier, and by a logic shift register addressing sequentially the switches of identical rank in the different arrays.

8. The device according to claim 6, wherein said switches are constituted by MOS transistors.

9. The device according to claim 7, wherein said switches are constituted by MOS transistors.

10. A device acording to claim 4, wherein said means for summing and reading the signals issuing from detectors of identical rank are constituted by a charge-transfer shift register with N stages, having parallel inputs and a series output, and by a charge/voltage conversion stage disposed at the output of said charge-transfer shift register, each stage of said register being connected to detectors of identical rank of the different rows.

11. A device according to claim 4, wherein said means for summing and reading the signal issuing from detectors of identical rank are constituted by charge-transfer shift registers having N stages, parallel inputs and a series output, each stage being associated to one row of detectors, and by a common summing and charge/tension conversion stage disposed at the output of said charge-transfer shift registers, the different charge-transfer shift registers being controlled by identical control signals.

12. A device according to claim 4, further comprising means for injecting a driving charge into the different stages of said charge-transfer shift register(s).

13. The device according to claim 12, wherein said means for injecting a driving charge are constituted by a charge injection stage which injects in series the driving charge into the stages of said charge-transfer shift register(s).

* * * * *